(12) United States Patent
Backes et al.

(10) Patent No.: US 8,345,643 B1
(45) Date of Patent: Jan. 1, 2013

(54) EXCEPTION PROCESSING FOR WIRELESS ROAMING

(75) Inventors: Floyd Backes, Sharon, NH (US); Paul D. Callahan, Carlisle, MA (US); Gary Vacon, East Falmouth, MA (US)

(73) Assignee: Piccata Fund Limited Liability Company, Wilmington, DE (US)

( * ) Notice: Subject to any disclaimer, the term of this patent is extended or adjusted under 35 U.S.C. 154(b) by 2569 days.

(21) Appl. No.: 11/050,568

(22) Filed: Feb. 3, 2005

(51) Int. Cl.
*H04W 4/00* (2009.01)
*H04W 84/12* (2009.01)
(52) U.S. Cl. ..................................... 370/338; 455/432.1
(58) Field of Classification Search ................... 370/338
See application file for complete search history.

(56) References Cited

U.S. PATENT DOCUMENTS

| | | |
|---|---|---|
| 6,795,407 B2 | 9/2004 | Chesson |
| 6,870,815 B2 | 3/2005 | McFarland et al. |
| 7,046,647 B2 * | 5/2006 | Oba et al. .................. 370/338 X |

* cited by examiner

*Primary Examiner* — Philip Sobutka
(74) *Attorney, Agent, or Firm* — Connolly Bove Lodge & Hutz LLP

(57) ABSTRACT

A client device detects when it roams between subnets and signals to a device in the subnet being entered. The client may detect roaming by monitoring subnet identifiers included in beacon signals transmitted by access points. When the client detects a beacon with a new subnet identifier and at the same time no longer detects a beacon with the original subnet identifier then roaming is indicated. When roaming is indicated the client responds by setting a tag, such as an IEEE 802.1q VLAN tag, in packets transmitted by the client. The tagged packets provide an indication to devices in the new subnet that the client has roamed into that new subnet. Devices in the new subnet, such as access points and switches, recognize the tagged packets and establish a path to the original subnet in response. For example, the tagged packets transmitted by the client may be encapsulated pursuant to a Layer 3 protocol and tunneled from a switch associated with the subnet being entered to a switch in the original subnet. If the client roams to other subnets the path is established from the new subnet to the original subnet, rather than an intermediate subnet.

4 Claims, 3 Drawing Sheets

EXCEPTION PROCESSING FOR WIRELESS ROAMING

FIELD OF THE INVENTION

This invention is generally related to network communications, and more particularly to roaming between wireless subnets.

BACKGROUND OF THE INVENTION

The problem of supporting roaming between wireless subnets is known. A client utilizing an Internet Protocol ("IP") session suffers an interruption when roaming between subnets while protocols are executed to establish a new IP address for the client. This happens because the IP address assigned to the client in the subnet that is being exited is not initially associated with the client in the subnet being entered. Session interruptions are problematic because some applications are sensitive to interruptions. For example, some applications may timeout or fail as a result of the interruption. In any event, noticeable delays may be annoying to the person using the client device even if the application does not timeout or fail.

It is known to facilitate roaming by maintaining the client IP address across subnet boundaries. This is done by establishing a tunnel from the subnet being entered to the subnet being exited. In particular, a switch in the subnet being entered creates the tunnel to a switch in the subnet being exited. Because the IP address employed by an application or service to communicate with the client is unchanged, there is no interruption. The technique facilitates roaming because it is transparent to both the service and the client. However, the switch in the subnet being entered is required to examine packets to identify roaming clients. In particular, the switch processes all received packets to determine whether the subnet address specified in the packets is associated with the subnet directly supported by that switch. If some other subnet is indicated, then a roaming client has been detected and the tunnel is created. However, examining packets to this extent is computationally costly, and somewhat wasteful because most packets examined are unlikely to be associated with a roaming client.

SUMMARY OF THE INVENTION

In accordance with the invention, a client device is operative to detect when it roams between subnets, and signal to the subnet being entered to initiate a path from the subnet being entered to an original subnet. The client may detect when it roams by monitoring subnet identifiers included in beacon signals transmitted by access points. In particular, when the client detects a beacon with a new subnet identifier and at the same time no longer detects a beacon with the original subnet identifier then the client signals to the new subnet that the client is roaming into the new subnet. Signaling to the new subnet may include setting a tag, such as an IEEE 802.1q VLAN tag, in packets transmitted by the client. Devices in the new subnet, such as access points and switches, recognize the tagged packets and are operative to establish a path to the original subnet in response. For example, the tagged packets transmitted by the client may be encapsulated pursuant to a Layer 3 protocol and tunneled from a switch associated with the subnet being entered to a switch in the original subnet. If the client roams to other subnets the path is established from the new subnet to the original subnet, rather than an intermediate subnet.

The invention advantageously mitigates the processing overhead required to support roaming while mitigating the possibility of interruption. Processing overhead is reduced because a high level tag such as an 802.1q VLAN tag is more easily examined and recognized, in terms of processing requirements, than a subnet address. Consequently, a relatively inexpensive chip may be employed in a subnet switch to identify a roaming client, and the cost of the switch may be reduced.

DETAILED DESCRIPTION

Figure 1:
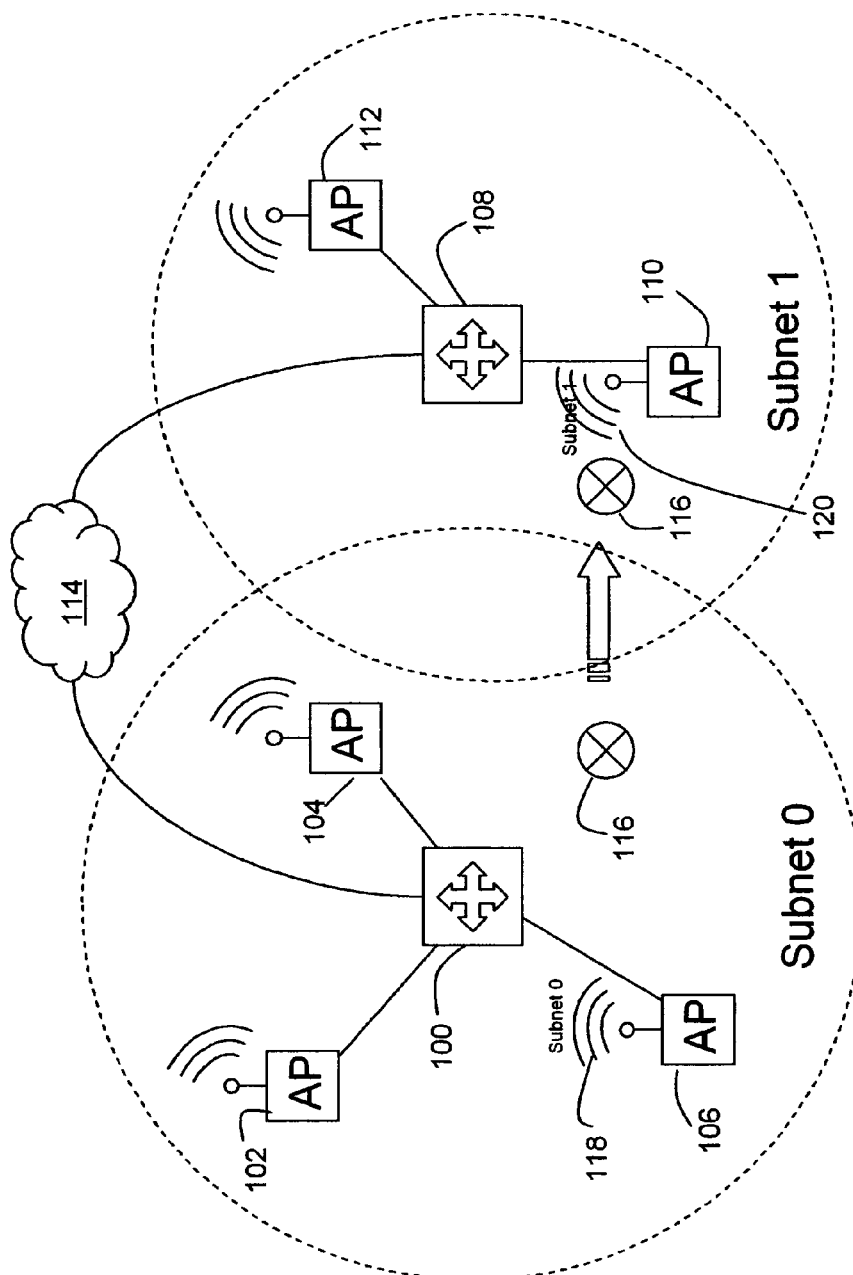
FIG. 1 is a block diagram of a network including multiple subnets which illustrates exception processing for roaming.

FIG. 1 illustrates a wireless network. The network includes two adjacent subnets.

Subnet 0 includes a switch 100 and three access points 102, 104, 106. Subnet 1 includes a switch 108 and two access points 110, 112. The switches 100, 108 are interconnected via a wireline network 114 such as a LAN, WAN or Internet. Each access point is associated with a single switch, with which it may be in communication via a physical, i.e., wired, connection. Each subnet has a boundary beyond which communication is not possible. In other words, the boundary represents the limits of wireless communications with the access points. The boundaries are illustrated as being circular to facilitate explanation, although they are likely to have an irregular shape in actual implementation. The purpose of the wireless network is to support communication with a client device 116 such as a personal computer, PDA or mobile phone.

The access points, client device and switches are adapted to facilitate roaming between subnets. Each access point broadcasts a beacon signal which indicates presence and also the subnet with which the access point is associated. The access points may receive an indication of the subnet identity from the switch with which they are associated. Those switches then include a subnet identifier in the beacon signal. For example, switch 100 may transmit an indication to access point 106 causing access point 106 to transmit a subnet 0 identifier in beacon signal 118. Similarly, switch 108 may transmit an indication to access point 110 causing access point 110 to transmit a subnet 1 identifier in beacon signal 120.

The client device 116 is adapted to recognize the subnet identifier in the beacon signals. When the client device is within the boundary of only a single subnet, the client device will detect the subnet identity from one of the beacon signals, perhaps specifically the beacon transmitted by the access point via which the client device is communicating. As the client device roams, it may be moved to a position 122 within the boundaries of more than one subnet. At this point the client device 116 is able to detect and identify multiple subnet identifiers from multiple beacons, e.g., beacons 118 and 120. The client device may be operative to either assume that it does not change subnets until the original subnet, e.g., subnet 0, can no longer be detected via beacon 118, i.e., until the client roams outside subnet 0, or assume that it is associated with whichever subnet is being identified by the beacon associated with the access point via which the client is communicating. In either case, when the client device 116 determines that it is roaming into subnet 1 then the client initiates actions to become associated with subnet 1.

One action that may be taken by the client device 116 to associate with subnet 1 upon roaming into subnet 1 is signaling to a device in subnet 1. This signaling may take various forms. For example, signaling may include setting a tag in one or more packets transmitted to access point 110 in subnet 1. In one embodiment the packets transmitted from the client device 116 are tagged with an IEEE 802.1q VLAN tag. The tag is preferably detectable by a device in subnet 1 without requiring significant processing overhead.

At least one device in subnet 1 is operative to detect the tagged packets being transmitted by the client device 116 and take action in response. A relatively low cost BRCM chip may be employed in either the access points 110, 112 or the switch 108 to detect the tagged packets. Once the tagged packets are detected, they are handed off to a mobility processor. The mobility processor is operative to establish a path back to the original client subnet, e.g., subnet 0. It should be noted that the original client subnet is not necessarily the adjacent subnet from which the client device immediately roamed. Rather, the original subnet is the subnet in which the session being employed by the client device was established. It should also be noted that the client may have established sessions in multiple subnets, thereby yielding multiple original subnets to which paths are established. The path may be implemented by encapsulating packets from the client device pursuant to a Layer 3 protocol and tunneling those packets from switch 108 to switch 100 via network 114.

Figure 2:
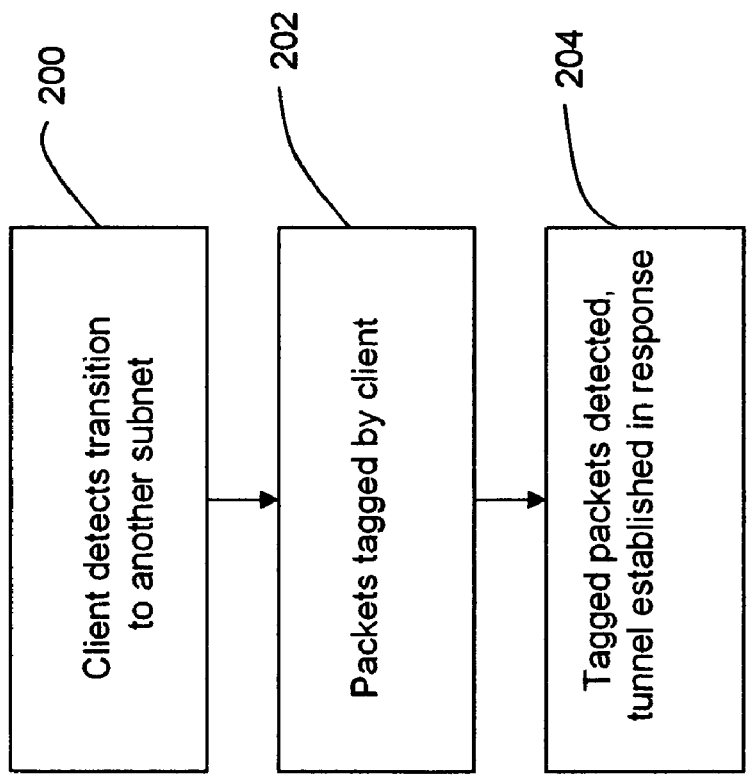
FIG. 2 is a flow diagram that illustrates a method of exception processing for roaming.
Figure 3:
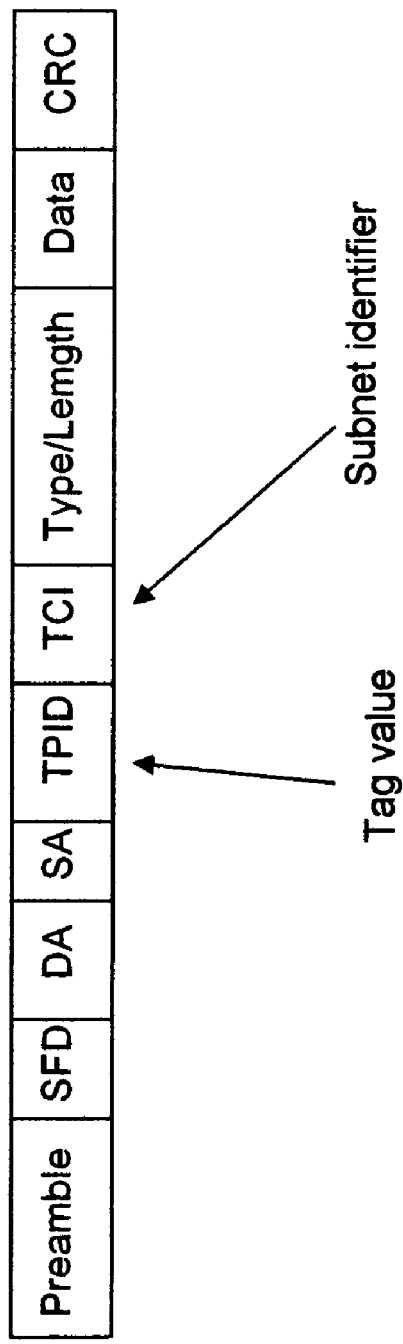
FIG. 3 is a diagram of a tagged packet in accordance with the method of FIG. 2.

Referring now to FIGS. 2 and 3, the inventive technique includes a method having three basic steps. In an initial step 200 the client detects a transition to another subnet, i.e., roaming. As already described, this may be implemented by including a subnet identifier in the beacon signals broadcast by the access points. In an intermediate step 202 the client tags packets once the transition between subnets is detected. As already described above, the tag may be an IEEE 802.1q VLAN tag. In particular, the TPID field may be set to a value indicating that the packet is tagged and the Tag Control Information ("TCI") field may include a subnet identifier, e.g., an identifier of subnet 0, the original subnet associated with the client device. In a final step 204 the tagged packets are detected by a device in the subnet being entered by the client device and a tunnel is established in response. As already described, the tunnel may be to a switch in the original subnet. Further, the detection of the tagged packets and the establishment of the tunnel may be implemented by an access point, a switch, some other device, or combinations thereof.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative structures, one skilled in the art will recognize that the system may be embodied using a variety of specific structures. Accordingly, the invention should not be viewed as limited except by the scope and spirit of the appended claims.

What is claimed is:

1. A switch that facilitates roaming comprising:
    an exception processing chip operable to process packets transmitted from a client device to a subnet with which the switch is associated, the exception processing chip operable to detect when a packet includes a Virtual Local Area Network ("VLAN") tag; and
    processing logic operable in response to detection of a packet with a VLAN tag to establish a path to a subnet indicated in the packet.

2. The switch of claim 1 wherein the tag includes an IEEE 802.1q VLAN tag.

3. A method for facilitating roaming with a switch comprising the steps of:
    processing packets transmitted from a client device to a subnet with which the switch is associated with an exception processing chip, the chip operable to detect when a packet includes a Virtual Local Area Network ("VLAN") tag; and
    establishing a path to a subnet indicated in the packet in response to detection of a packet with a VLAN tag.

4. The method of claim 3 wherein the tag includes an IEEE 802.1q VLAN tag.

* * * * *